US011855874B2

(12) United States Patent
Pattabhiraman et al.

(10) Patent No.: US 11,855,874 B2
(45) Date of Patent: Dec. 26, 2023

(54) MULTI-TIERED CLOS NETWORK FABRIC REVERSE PATH FORWARDING DEVICE SELECTION

(71) Applicant: Arista Networks, Inc., Santa Clara, CA (US)

(72) Inventors: Bharathram Pattabhiraman, San Jose, CA (US); Ryan Michael Halbrook, Salinas, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/392,854

(22) Filed: Aug. 3, 2021

(65) Prior Publication Data
US 2023/0041539 A1    Feb. 9, 2023

(51) Int. Cl.
*H04L 45/02* (2022.01)
*H04L 45/16* (2022.01)
*H04L 45/48* (2022.01)

(52) U.S. Cl.
CPC .............. *H04L 45/02* (2013.01); *H04L 45/16* (2013.01); *H04L 45/48* (2013.01)

(58) Field of Classification Search
None
See application file for complete search history.

(56) References Cited

U.S. PATENT DOCUMENTS

| 6,553,028 | B1 | 4/2003 | Tang et al. |
| 8,090,805 | B1* | 1/2012 | Chawla ................... H04L 12/00 709/240 |
| 11,271,816 | B2* | 3/2022 | Reehil ................... H04L 41/122 |
| 2007/0097895 | A1* | 5/2007 | Keshavarzian ... H04W 52/0219 340/870.01 |
| 2008/0062891 | A1* | 3/2008 | Van der Merwe ...... H04L 45/04 370/254 |
| 2018/0063723 | A1* | 3/2018 | Sanderovich ......... H04L 45/745 |
| 2019/0036717 | A1* | 1/2019 | Kebler .................. H04L 65/611 |
| 2022/0029911 | A1* | 1/2022 | Zhang ................... H04L 45/745 |

OTHER PUBLICATIONS

Fenner et. al., "Protocol Independent Multicast—Sparse Mode (PIM-SM) : Protocol Specification (Revised)", Request for Comments (RFC) 7761 (Mar. 2016) 137 pages.
International Search Report and Written Opinion issued for International PCT Application No. PCT/US2022/037993, dated Oct. 10, 2022, 12 pages.

* cited by examiner

*Primary Examiner* — Xavier S Wong
(74) *Attorney, Agent, or Firm* — Sprinkle IP Law Group

(57) ABSTRACT

A method for reverse path forwarding (RPF) selection by a network device connected to a network includes receiving an advertisement message from each of a plurality of neighbor devices within the network, parsing the advertisement message to determine a color identification (ID) of each of the neighbor devices, and selecting, from among the neighbor devices, a RPF device based on the color ID of each of the neighbor devices.

13 Claims, 11 Drawing Sheets

MULTI-TIERED CLOS NETWORK FABRIC REVERSE PATH FORWARDING DEVICE SELECTION

BACKGROUND

A communication system may enable devices to communicate with one
another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1A:
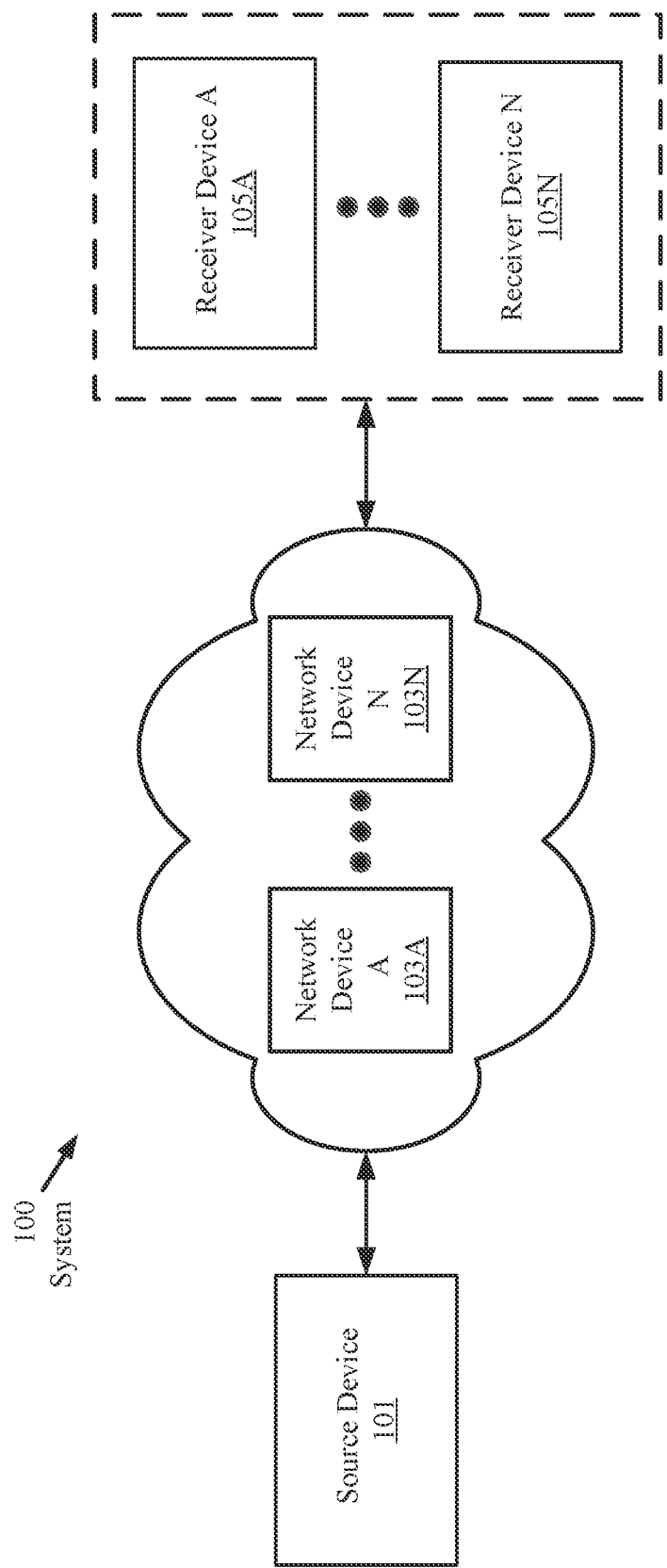
FIG. 1A shows a system in accordance with one or more embodiments described herein.

Specific embodiments will now be described with reference to the accompanying figures.

In one or more embodiments disclosed herein, in a multi-tier clos network fabric using multicast traffic, multiple leaves (i.e., multicast receiver devices) are connected to a multicast source device through one or more spine layers (spines) consisting of one or more network devices (e.g., a router, a switch, etc.). Without a same view of their upstream neighbors (i.e., the network devices of a spine), each downstream device (e.g., a leaf or a network device of a spine) that could have shared parts of a tree with another downstream device toward the multicast source device may build its own independent tree. Because each upstream device creates a distinct copy of a data packet being transmitted for each tree it detects (i.e., for each immediate downstream device subscribed to the upstream device), the bandwidth of the entire network may be severely impacted as these data packets travel downstream through the network fabric. Said another way, a large amount of redundant data packets may be created throughout the network fabric when unnecessary trees are established.

In one or more embodiments disclosed herein, to provide better bandwidth utilization within the network fabric, a mechanism is provided that allows each downstream device to have the same or a topologically equivalent view of their upstream neighbors. In particular, in one or more embodiments, each network device of the spine layers is configured with a color value (color identification (color ID)) shared by all devices that are topologically equivalent and a unique device identification (device ID). A network device with one color will then only choose an upstream neighbor with the same color (if one were to exist) as its reverse path forwarding (RPF) device. This prevents unnecessary trees from being established within the network fabric, which advantageously prevents redundant data packets from being created within the layers of the network fabric.

In one or more embodiments disclosed herein, in the case of a tie breaker (i.e., a situation where more than one upstream device of a spine layer has the same color ID as the immediate downstream device), the next upstream device is selected using the device ID. Furthermore, the selection of an upstream device as the RPF device may be a combination of: (i) selecting the upstream device that provides the shortest route to the source; (ii) selecting based on a restriction set by a user of a multicast receiver device or an administrator of the network; (iii) selecting by hashing some combination of the color ID, the device ID, or an interface ID (in case of a tie with the device ID); or (iv) any other suitable mechanism set by the user or administrator.

In one or more embodiments disclosed herein, the color ID of each network device is set within a specific portion (e.g., the space within the Hello option reserved for private use (see RFC 7761)) of each network device's protocol-independent multicast (PIM) Hello message. As such, a network device's color information will be broadcast to all neighbor devices. In one or more embodiments, the PIM Hello message may include an authentication factor. Only network devices that are able to identify the authentication factor can access the color information in the PIM Hello message.

Various embodiments of the disclosure are described below.

FIG. 1A shows a system (100) in accordance with one or more embodiments of the disclosure. The system (100) includes a source device (101) connected to one or more receiver devices (105A-105N) through one or more network devices (103A-103N). Receiver devices (105A-105N) may use the same multicast group portion (illustrated using the broken rectangle) of a protocol-independent multicast sparse-mode (PIM-SM) configuration. Each of these components is described below.

In one or more embodiments disclosed herein, a source device (101) may be any device that includes functionality to transmit data towards multiple receivers (i.e., receiver devices (105A-105N)). For example, the source device (101) is a computing device (see, e.g., FIG. 4).

For example, in one embodiment of the disclosure, the source device (101) is a physical device or a virtual device (i.e., a virtual machine executing on one or more physical devices) that may be used for performing various embodiments of the disclosure. The physical device may correspond to any physical system with functionality to implement one or more embodiments of the disclosure. For example, the physical device may be a server (i.e., a device with at least one or more processor(s), memory, and an operating system) that is directly (or operatively, e.g., via the network) connected to at least one network device (e.g., 103A-103N) and at least one receiver device (e.g., 105A-105N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, source device (101) includes executable instructions (stored in a non-transitory computer readable medium (not shown)), which when executed, enable the source device (101) to perform the functionality described through this application.

In one embodiment of the disclosure, the source device (101) may be a multicast source device that transmits data towards one or more multicast groups (e.g., multicast group portions including one or more of receiver devices (105A-105N)). A multicast source device may not necessarily be aware of the devices of a multicast group to which the multicast source device transmits data, but may instead be configured to transmit a single copy of the data to a single alias representing the multicast group (e.g., a multicast Internet Protocol (IP) address defined for the group). A multicast group may have zero or more members at any given time. As used herein, the term multicast refers to the transmission of data from a single source to multiple recipients via a network. In one or more embodiments disclosed herein, the source device (101) may also be configured as a unicast source device that transmits data towards only one receiver device.

Data transmitted by a source device (101) may originate from one or more applications (not shown) executing on the source device (101), and may be transmitted in the form of a data packet. As an example, a source device (101) may be a device for transmitting video data to one or more receivers so that the video data may be viewed (e.g., via a display device) by a user of each receiver. In a multicast configuration, a single copy of multicast data (i.e., data transmitted by the source device (101) to one or more multicast groups) may be transmitted from the source device (101), with replication of the data for the multicast receivers occurring via the one or more network devices (103A-103N) along the network path between the source device (101) and the various receivers of the multicast group.

In one embodiment of the disclosure, the one or more network device(s) (103A-103N) are physical devices that include persistent storage, memory (e.g., random access memory), one or more processor(s) (including a switch chip), and two or more physical ports. In one embodiment of the disclosure, the switch chip is hardware that determines which egress port on a network device (103A-103N) to forward media access control (MAC) frames. The switch chip may include egress and ingress ports that may connect to ports on the network device (103A-103N). Each port may or may not be connected to another device (e.g., a server, a switch, a router, etc.). The network device (103A-103N) may be configured to receive packets via the ports and determine whether to: (i) drop the packet; (ii) process the packet in accordance with one or more embodiments of the disclosure; and/or (iii) send the packet, based on the processing, out of another port on the network device (103A-103N).

How the network device (103A-103N) makes the determination about whether to drop the packet, and/or send the packet to another device on the network depends, in part, on whether the network device (103A-103N) is a layer-2 (L2) switch or a layer-3 (L3) switch (also referred to as a multilayer switch), which may perform at least some functions of a router. If the network device (103A-103N) is operating as a L2 switch, the network device (103A, 103N) uses the destination MAC address along with a forwarding table to determine out of which port to send the packet. If the network device (103A-103N) is operating as a L3 switch, the network device (103A-103N) uses the destination Internet Protocol (IP) address along with a routing table to determine out of which port to send the packet. If the network device (103A-103N) is a multilayer switch, the multilayer switch includes functionality to process packets using both MAC addresses and IP addresses.

In one or more embodiments disclosed herein, the persistent storage in the network device may include any type of non-transitory computer readable medium that stores data. For example, the data in the persistent storage may be instructions, which, when executed by one or more processor(s) in the network device (103A-103N), enable the network device (103A-103N) to perform all or a portion of the functions described in accordance with one or more embodiments of the disclosure (see e.g., FIGS. 2A-3D).

Examples of the network devices (103A-103N) include, but are not limited to, a router, a switch, and a multilayer switch. The network devices (103A-103N) are not limited to the aforementioned specific examples. Additional details about the network devices (103A-103N) are described below with respect to FIG. 1B.

In one embodiment of the disclosure, the network devices (103A-103N) may reside on the network. As used herein, a network may be the medium through which the source device (101), the network devices (103A-103N), and the receiver devices (105A-105N) are operatively connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one embodiment of the disclosure, the one or more receiver devices (105A-105N) are any devices that include functionality to receive data from a source device (101). For example, each receiver device (105A-105N) may be a computing device (see e.g. FIG. 4) or a virtual instance of the computing device (discussed above). Alternatively, a receiver device (105A-105N) may be a network device (discussed above).

In a multicast setting, a receiver device (105A-105N) may be a multicast receiver device that includes functionality to be a member of a multicast group portion, and, as such, to receive data from a multicast source device (e.g., the source device (101)). The multicast receiver device may include functionality to join and leave the multicast group portion via join messages and leave messages, respectively. As an example, join and/or leave messages may be Internet Group Management Protocol (IGMP) messages.

One scheme for propagating multicast network traffic in a network is defined, at least in part, by RFC 7761, the PIM-SM Protocol Specification. PIM-SM is a multicast protocol that can use routing information obtained via various other unicast and/or multicast routing protocols in order to build unidirectional shared trees that are rooted at a Rendezvous Point (RP) (e.g., network device (103A)), and which branch out towards one or more multicast receiver devices. In one or more embodiments of the disclosure, PIM-SM is enabled on a network device, thereby enabling the network device to participate in the propagation of multicast traffic using the PIM-SM protocol. PIM-SM may be enabled for individual interfaces of a network device. A network device with at least one PIM interface may be referred to as a PIM enabled network device.

Figure 1B:
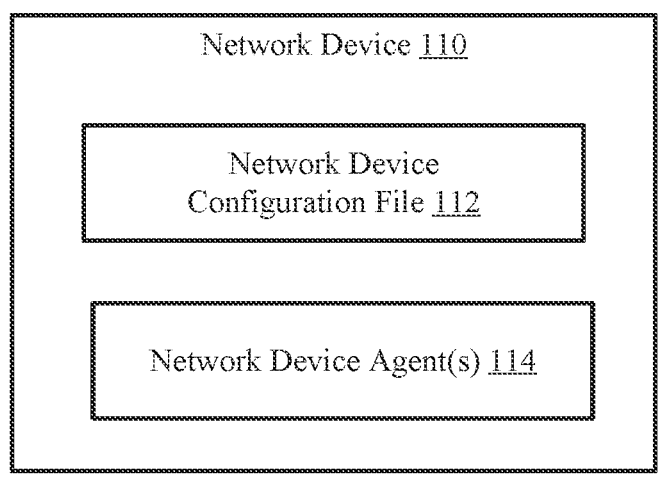
FIG. 1B shows a diagram of a network device in accordance with one or more embodiments disclosed herein.

FIG. 1B shows a network device (110) in accordance with one or more embodiments of the disclosure. The network device (110) may be any one of the one or more network devices (103A-103N) discussed above. In addition to the components discussed above in reference to FIG. 1A, the network device (110) further includes a network device configuration file (112) and one or more network device agents (114). The network device (110) may include additional, fewer, and/or different components without departing from the disclosure. Each of the components illustrated in FIG. 1B is described below.

In one or more embodiments disclosed herein, the network device configuration file (112) specifies information regarding an arrangement or set-up of the hardware and software components making up the network device (110). For example, the configuration file (112) may include information such as a device identification (device ID), a color value (color identification (color ID)), and one or more interface identifications (interface IDs). The configuration file may also include other information (e.g., a physical address (media access control (MAC) address) of the network device, an internet protocol (IP) address of the network device, device states of the network device, etc.) that can be used to identify the network device and/or generate any of the above-discussed device and/or interface IDs. In one or more embodiments, the generated device, color, and/or interface IDs may be stored in non-persistent storage of the network device (e.g., 404, FIG. 4).

In one or more embodiments disclosed herein, the device ID may be a string of numbers and/or characters that is used to represent an identity of the network device (110) (e.g., a serial number of the network device, a name of the network device, etc.). Each of the network devices (e.g., 103A-103N, FIG. 1) may be configured with a unique device ID by a user (e.g., an administrator of the network device or network). Alternatively, one or more of the network devices (103A-103N) may have the same device ID.

In one or more embodiments disclosed herein, the color ID may be a string of numbers and/or characters that is used to represent a color (e.g., red, green, blue, black, pink, etc.). Each of the network devices (e.g., 103A-103N, FIG. 1A) may be configured with a color ID by a user (e.g., an administrator of the network device or network). In one or more embodiments, multiple ones of the network devices (e.g., 103A-103N, FIG. 1A) may have the same color ID. While described as a color ID herein, it should be understood that this is merely for easy understanding and reference; in various embodiments, the color ID may define any consistent code of bits, number, character or string, whether or not referencing a color, that may similarly provide the functionality as described herein.

In one or more embodiments disclosed herein, the interface IDs may be a string of numbers and/or characters that is used to identify one or more ports (e.g., egress ports) between the network device (110) and another network device on the network. Each interface ID of the network device (110) may be unique in order to clearly differentiate each individual port.

In one or more embodiments disclosed herein, the configuration file (112) may also store information configured to be compiled into an advertisement message (e.g., a PIM Hello message). The advertisement message may be a data packet used by the network device (110) to advertise its existence as a PIM enabled network device to other network devices on the network. In one or more embodiments, the advertisement message includes one or more blocks of code for storing the device ID, the color ID, and the interface IDs. The advertisement message may also include one or more blocks of code for storing an authentication value unique to a manufacturer of the network device (110). More details of the authentication value are discussed below. Alternatively, the advertisement message may not include the interface IDs. Rather, the interface IDs may be generated by a user of the network device using a name of the interface (e.g., Ethernet 1).

In one embodiment of the disclosure, the network device agent(s) (114) interacts with the other components of the network device (110). Each network device agent (114) facilitates the implementation of one or more protocols, services, and/or features of the network device (110). Examples of network device agents (114), include, but are not limited to, a bug-alerts agent, a policy agent that manages access control lists, a user interface agent, a routing information base agent, a forwarding information base agent, and a simple network management protocol (SNMP) agent.

Furthermore, each network device agent (114) includes functionality to access various portions of the network device (110) in order to control a route programming functionality of the network device agent (114). In one embodiment of the disclosure, one or more network device agents (114) manage: (i) receipt and forwarding of data packets from other network devices on the network; (ii) compilation of advertisement messages to the other network devices; (iii) a processing of advertisement messages received from the other network devices; and (iv) selection of a reverse path forwarding (RPF) device from among a set of neighboring network devices (also referred to as neighboring devices or neighbor devices). Above configurations (iii) and (iv) of the network device agent(s) (114) will be discussed in more detail in FIGS. 2A-3D below.

In one or more embodiments disclosed herein, the network device agent(s) (114) is configured to initialize a selection of a RPF device from among a set of neighbor devices. The neighbor devices may be one or more network devices that are directly connected to the network device (110). In one or more embodiments, the network device (110) may have a set of upstream neighbor devices (i.e., neighbor devices that are closer in connection to a source device) and a set of downstream neighbor devices (e.g., neighbor devices that are closer in connection to a receiver device). The RPF device is selected from the set of upstream neighbor devices. An example of this configuration will be discussed in FIG. 3A.

Furthermore, the network device (110) may have multiple sets of upstream and downstream neighbor devices. Each of the neighbor devices may transmit an advertisement message to the network device (110). As a result, the network device (110) may store the device ID, color ID, and interface IDs of each of its neighbor devices. In one or more embodiments, the upstream neighbor device of the network device (110) may be the source device (e.g., 101, FIG. 1A). Furthermore, the downstream neighbor device of the network device may be the receiver device (105A-105N, FIG. 1A). A network device (110) may be, directly or indirectly, connected to multiple source and receiver devices.

In one or more embodiments disclosed herein, the network device agent(s) (114) may be configured to initialize the selection of the RPF device upon receiving a reverse path forwarding request (RPF request) from a downstream neighbor device. The RPF request may include instructions for the network device (110) to build a path through the network back to the source device in order for a receiver device connected (indirectly or directly) to the network device (110) to receive a data packet from the source device.

In one or more embodiments disclosed herein, upon receiving the RPF request, the network device agent (114) determines whether the network device (110) is directly connected to the source device. In the event the network device (110) is directly connected to the source device and the source device is a network device (e.g., a router), the network device agent (114) is configured to initiate programming of a route between the network device (110) and the source device.

Alternatively, in one or more embodiments, in the event the network device is not directly connected to the source device (i.e., one or more neighbor devices exist between the network device (110) and the source device), the network device agent (114) initializes a RPF selection process from among the neighbor devices connected to the network device. The RPF selection process is based on at least one of the device ID, the color ID, or the interface IDs of the upstream neighbor devices. Furthermore, this RPF selection process as well as other functions of the network device agent (114) are discussed in more detail below in FIGS. 2C-2D and 3A-3D.

In one or more embodiments disclosed herein, the network device agent (114) is configured to receive the device ID, color ID, and interface IDs of the network device (110) from a user and store each of these IDs in the configuration file (112). Alternatively, in one or more embodiments and as discussed above, the device and/or interface IDs may be generated using existing information (e.g., a MAC address, an interface name, etc.) stored in and/or associated with the network device.

One skilled in the art will recognize that the architecture of the system (100), of the network device (110), and of the network is not limited to the components shown in FIGS. 1A and 1B. For example, the network may include any number and any type of network devices participating in the sharing of states. Further, the network device (110) may include components not shown in FIG. 1B.

Figure 2A:
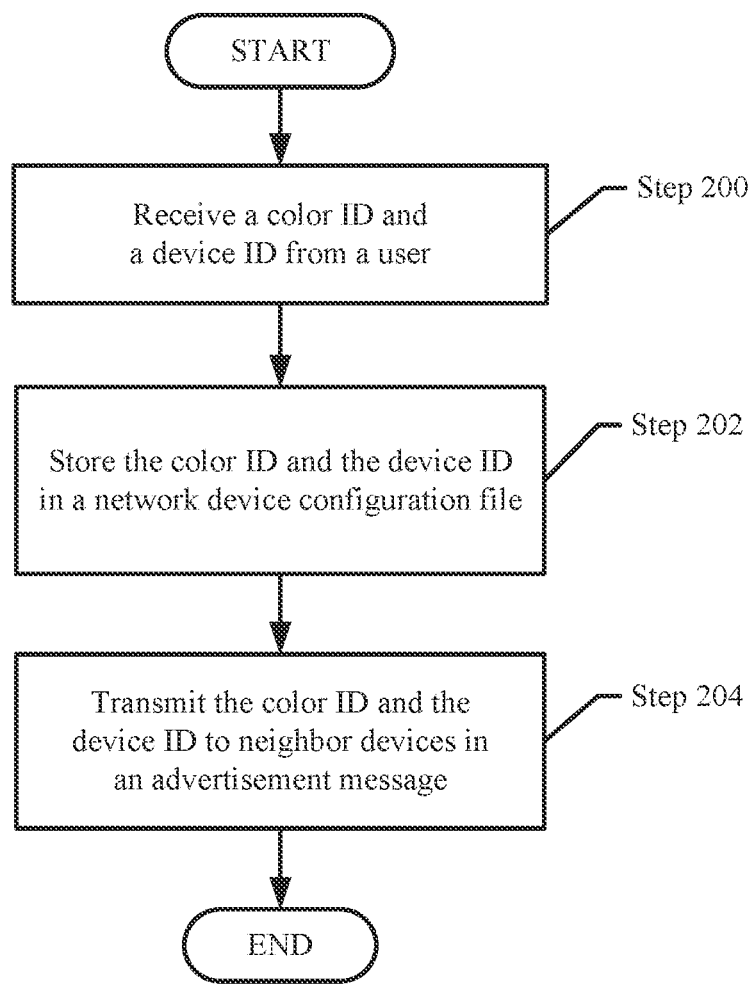
FIG. 2A shows a flowchart describing a method for configuring a network device with a color value (color identification (color ID) in accordance with one or more embodiments described herein.

FIG. 2A shows a flowchart of a method in accordance with one or more embodiments of the disclosure. The method depicted in FIG. 2A may be performed to configure a network device (e.g., 103A-103N, FIG. 1A; 110, FIG. 1B) with a color value (or color identification (color ID)) in accordance with one or more embodiments of the disclosure. The method shown in FIG. 2A may be performed by, for example, a network device agent (e.g., 114, FIG. 1B) of the network device. Other components of the systems in FIGS. 1A-1B may perform all, or a portion, of the method of FIG. 2A without departing from the disclosure.

While FIG. 2A is illustrated as a series of steps, any of the steps may be omitted, performed in a different order, additional steps may be included, and/or any or all of the steps may be performed in a parallel and/or partially overlapping manner without departing from the disclosure. In Step 200, the network device receives a color ID and a device ID from a user. In one or more embodiments disclosed herein, the color ID and the device ID may be directly configured (i.e., through one or more input devices directly connected to the network device) into the network device by updating one or more settings and/or configurations in a configuration file (e.g., 112, FIG. 1B) stored in the network device. In one or more embodiments, the color ID and device ID may be received in a data packet including instructions to update the configuration file that is transmitted over the network from the user's computing device.

Furthermore, in one or more embodiments, the network device may also receive the interface IDs in Step 200. The interface IDs may be received in the same manner as the color ID and the device ID.

In Step 202, the color ID and the device ID are stored in the configuration file of the network device. In one or more embodiments, the configuration file may be a data structure (e.g., a list, table, etc.) storing information regarding an arrangement or set-up of the hardware and software components making up the network device. The network device agent updates the data structure to include the color ID and the device ID.

In one or more embodiments, if the configuration file already includes a color ID and a device ID, the existing color ID and the device ID may be overwritten with the color ID and device ID received in Step 200.

In Step 204, the color ID and the device ID are transmitted to neighbor devices in an advertisement message. In one or more embodiments, the network device agent compiles the advertisement message and includes the color ID and the device ID in the advertisement message. The network device agent may also include an authentication value in the advertisement message. In one or more embodiments, the authentication value may be a manufacturer identifier unique to the manufacturer and/or administrator of the network device, and may be used to identify the manufacturer and/or administrator associated with the network device.

In one or more embodiments disclosed herein, the advertisement message may be repeatedly sent to some or all of the neighbor devices at a predetermined interval. The predetermined interval may be any amount of time (e.g., 30 seconds, 5 minutes, half a day, etc.) set by a user. Furthermore, the advertisement message may be a PIM Hello message.

Figure 2B:
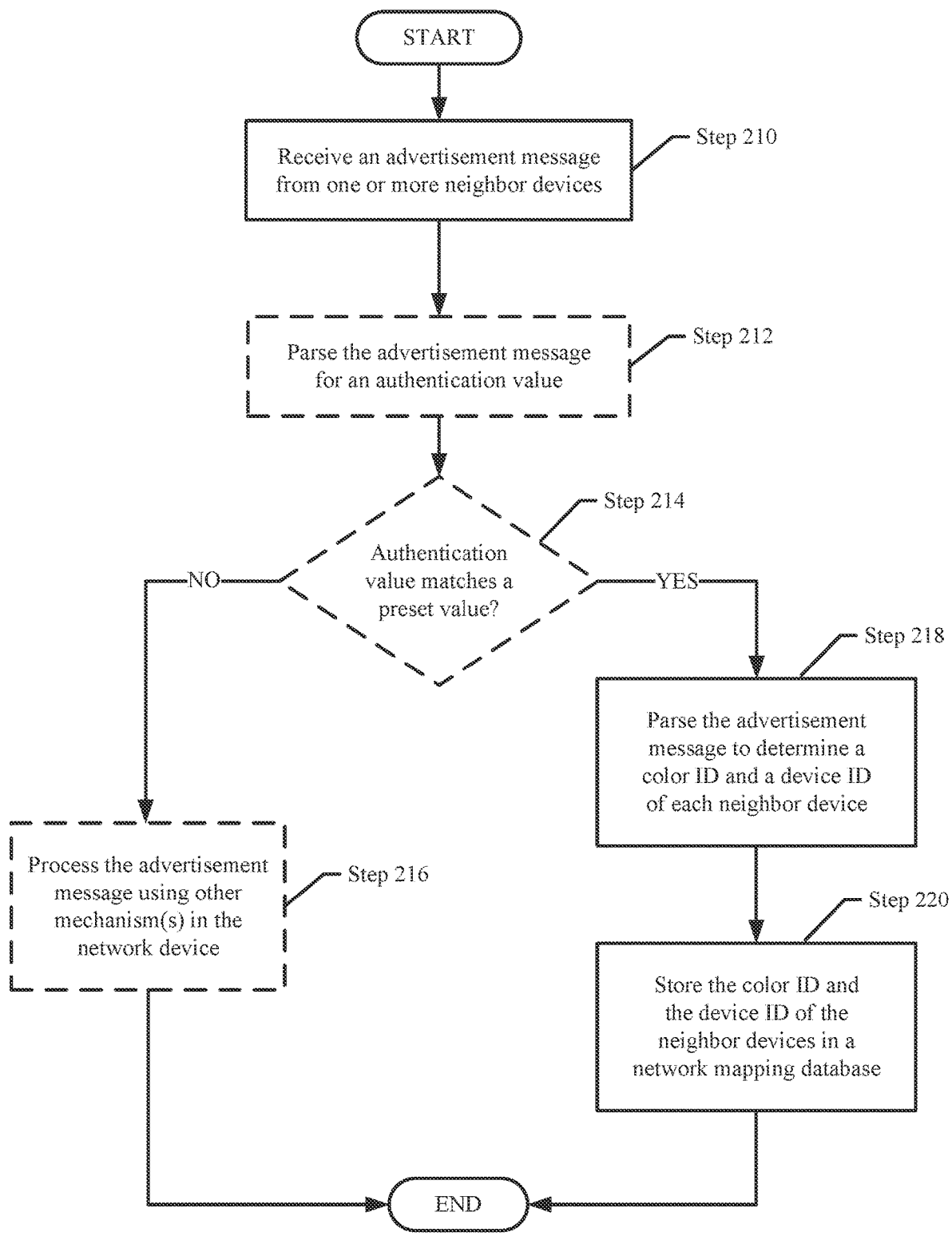
FIG. 2B shows a flowchart describing a method for determining a color ID of neighbor network devices in accordance with one or more embodiments described herein.

FIG. 2B shows a flowchart of a method in accordance with one or more embodiments of the disclosure. The method depicted in FIG. 2B may be performed to configure a network device (e.g., 103A-103N, FIG. 1A; 110, FIG. 1B) with a color value (or color identification (color ID)) in accordance with one or more embodiments of the disclosure. The method shown in FIG. 2B may be performed by, for example, the network device agent (e.g., 114, FIG. 1B) of the network device. Other components of the systems in FIGS. 1A-1B may perform all, or a portion, of the method of FIG. 2B without departing from the disclosure.

While FIG. 2B is illustrated as a series of steps, any of the steps (e.g., the steps shown with broken lines in FIG. 2B) may be omitted, performed in a different order, additional steps may be included, and/or any or all of the steps may be performed in a parallel and/or partially overlapping manner without departing from the disclosure.

In Step 210, a network device receives an advertisement message from one or more neighbor devices. The advertisement message may include a color ID, a device ID, and/or interface IDs of the neighbor device from which the advertisement message is transmitted. The advertisement message may also include an authentication value.

In Step 212, the advertisement message is parsed to determine whether the advertisement message includes the authentication value. In one or more embodiments, if the advertisement message does not include the authentication value (i.e., there is no need to authenticate the advertisement message), the network device agent directly retrieves the color ID, device ID, and/or interface IDs stored in the advertisement message and stores this information in a storage of the network device. In one or more embodiments, the device ID and interface IDs will be retrieved whether or not an authentication process is executed for the advertisement message.

In one or more embodiments disclosed herein, the retrieved color ID, device ID, and/or interface IDs may be stored in a network mapping database stored in the storage in the network device. The network mapping database may be a data structure (i.e., a list, table, chart, spreadsheet, etc.) storing information of each neighbor device in the network. Using the network mapping database, the network device agent may be able to determine parts or all of a topology of the network.

In Step 214, if the advertisement message includes the authentication value, a determination is made to determine whether the authentication value included in the advertisement message matches a preset value (e.g., a manufacturer's identification (ID)) stored in the network device. This determination prevents network devices developed by different manufacturers from getting confused by the color ID included in the advertisement message. In particular, the color ID may be included in a space within the PIM Hello message designated for private use (as defined in RFC 7761). Certain manufacturers may use the private space for other functions. These other functions may be disrupted by the inclusion of the color ID in the advertisement message.

If it is determined that the authentication value does not match the preset value (i.e., NO in Step 214), the network device processes, in Step 216, the advertisement message using other mechanism(s) in the network device. For example, assume that the color ID is stored in a space (e.g., the space designated for private use) within the advertisement message separate from space(s) storing the device ID and the interface IDs. The network device agent will ignore the space designated for private use and retrieve information from all other spaces within the advertisement message.

Alternatively, if it is determined that the authentication value matches the preset value (i.e., YES in Step 214) in the advertisement message, the network device in Step 218 parses the advertisement for all of the color ID, the device ID, and the interface IDs (if included), and proceeds to Step 220. Alternatively, if an authentication process is not required to be executed for the advertisement message, the process proceeds directly from Step 210 to Step 218.

In Step 220, the color ID, the device ID, and the interface IDs (if included) of the neighbor devices are stored in the network device. In one or more embodiments, the network device agent stores the color ID, the device ID, and the interface IDs in the above-discussed network mapping database in the storage of the network device.

Figure 2C:
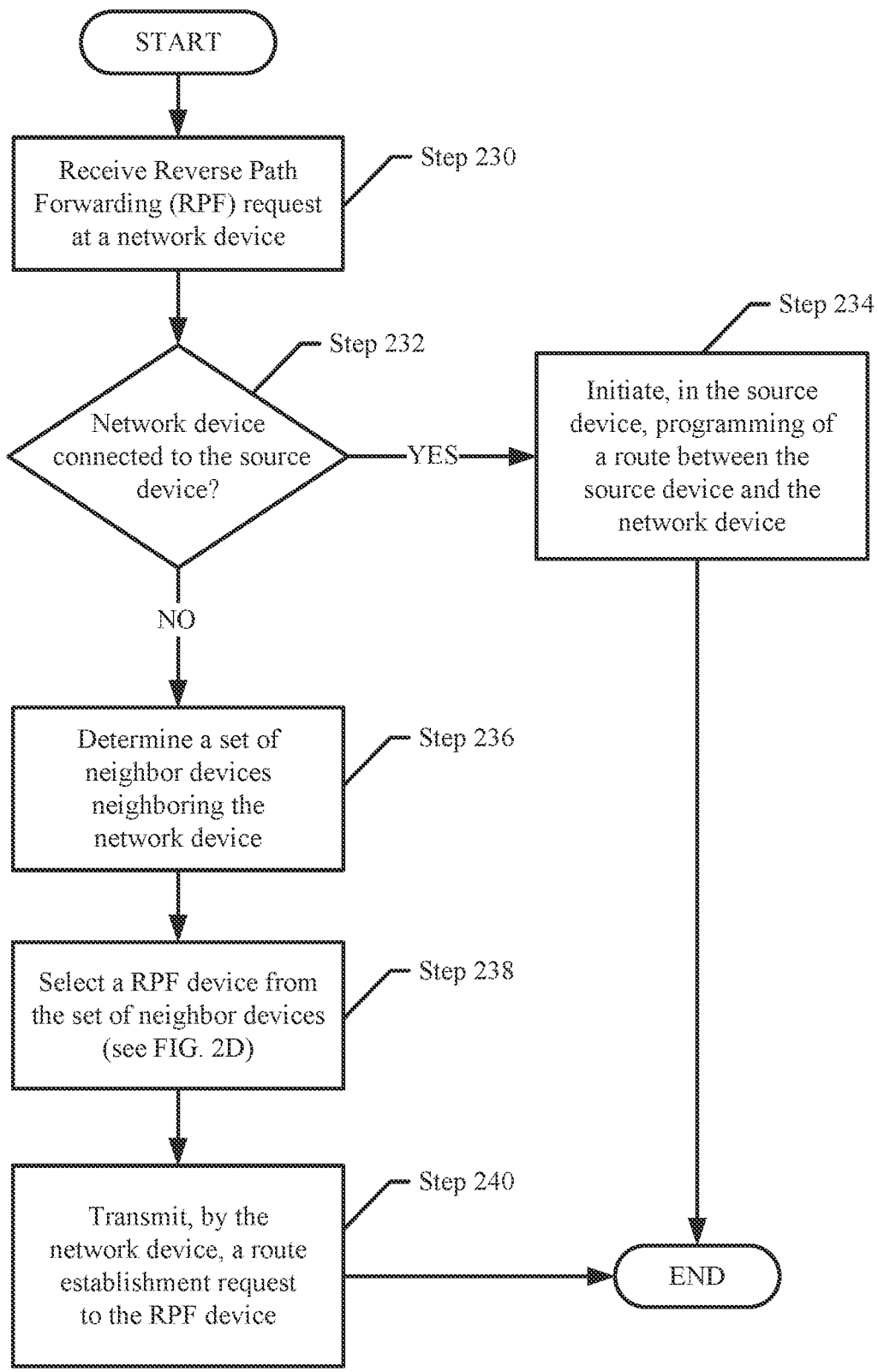
FIG. 2C shows a flowchart describing a method for processing a reverse path forwarding request (RPF) request by a network device in accordance with one or more embodiments described herein.

FIG. 2C shows a flowchart of a method in accordance with one or more embodiments of the disclosure. The method depicted in FIG. 2C may be performed to process a reverse path forwarding request (RPF request) by a network device (e.g., 103A-103N, FIG. 1A; 110, FIG. 1B) in accordance with one or more embodiments of the disclosure. The method shown in FIG. 2C may be performed by, for example, the network device agent (e.g., 114, FIG. 1B) of the network device. Other components of the systems in FIGS. 1A-1B may perform all, or a portion, of the method of FIG. 2C without departing from the disclosure.

While FIG. 2C is illustrated as a series of steps, any of the steps may be omitted, performed in a different order, additional steps may be included, and/or any or all of the steps may be performed in a parallel and/or partially overlapping manner without departing from the disclosure.

In Step 230, a network device receives a reverse path forwarding request (RPF request). In one or more embodiments, the RPF request may be transmitted from a receiver device or from a downstream neighbor device. For example, if the network device is directly connected to the receiver device, the RPF request is transmitted from the receiver device. If a neighbor device exists between the network device and the receiver device, the RPF request is transmitted from the neighbor device. In one or more embodiments, the RPF request includes instructions for the network device to select a network device through which to establish a path to the source device.

In Step 232, the network device determines whether it is connected to the source device. In one or more embodiments, information with regard to whether a network device is a source device may be included in a PIM Hello message transmitted by the network device. The network device agent may parse the information in the network mapping database compiled using information included in received PIM Hello messages to make the determination in Step 232.

If it is determined that the network device is connected to the source device (i.e., YES in Step 232) and that the source device is a network device such as a router, the network device initiates in Step 234 programming of a route between the source device and the network device. This completes the route from the receiver device to the source device in the topology of the network. In one or more embodiments, once a route is programmed between the source device and the network device, the source device is able to send data packets to one or more receiver devices connected, either directly or indirectly, to the network device. If the source device is not a network device such as a router, no route is established between the source device and the network device.

Alternatively, if it is determined that the network device is not connected to the source device (i.e., if there are one or more neighbor devices between the source device and the network device; and NO in Step 232), the network device initiates a sequence in Step 236 to determine a set of neighbor devices neighboring the network device. In one or more embodiments, the set of neighbor devices are upstream from the network device. The set of neighbor devices may be determined by the network device agent using the network topology information stored in the network mapping database.

In Step 238, the network device selects a RPF device from the set of neighbor devices identified in Step 236. In one or more embodiments, the RPF device may be selected by the network device agent using at least one of the device ID, the color ID, and the interface IDs of each of the neighbor devices in the set of neighbor devices. Additional details of selecting the RPF device are discussed below in FIG. 2D.

In Step 240, the network device transmits a route establishment request to the RPF device selected in Step 238. In one or more embodiments disclosed herein, in the PIM-SM context, the route establishment request may be an (S, G) join request. Alternatively, in the event that the network device is joining towards a rendezvous point (RP), the route establishment request may be an (*, G) join request. The route between the network device and the selected RPF device may be established in the software layer (i.e., control plane), in the hardware layer (i.e., the data plane), or in both the software and the hardware layers. Upon receipt of the route establishment request, the RPF device will initiate a programming of the route between the RPF device and the network device. Once a route is established, data packets may be exchanged between the two devices.

Figure 2D:
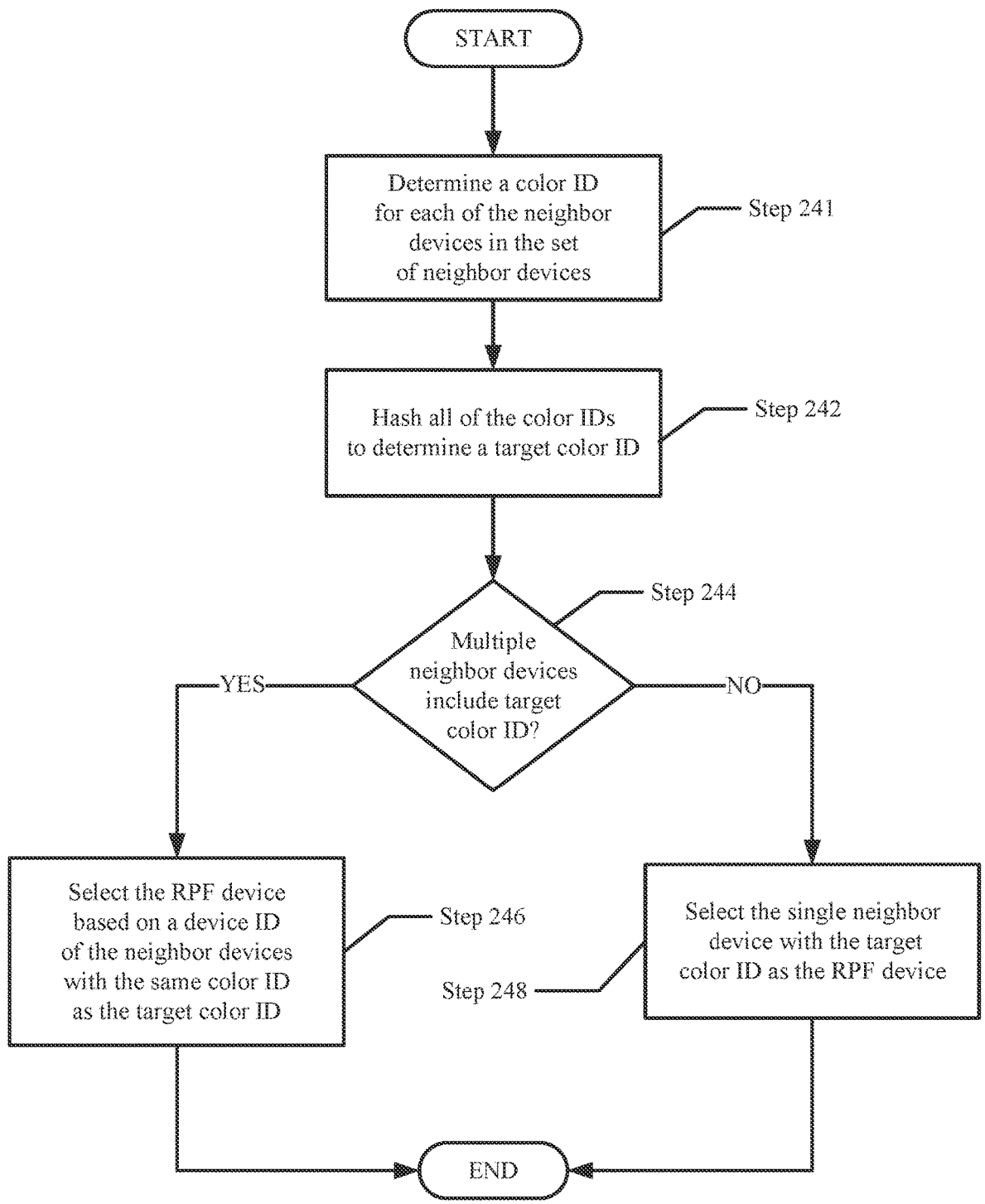
FIG. 2D shows a flowchart describing a method for selecting a RPF device from a set of neighbor devices in accordance with one or more embodiments described herein.

FIG. 2D shows a flowchart of a method in accordance with one or more embodiments of the disclosure. The method depicted in FIG. 2D may be performed to select a RPF device from a set of neighbor devices in accordance with one or more embodiments of the disclosure. The method shown in FIG. 2D may be performed by, for example, the network device agent (e.g., 114, FIG. 1B) of the network device. Other components of the systems in FIGS. 1A-1B may perform all, or a portion, of the method of FIG. 2D without departing from the disclosure.

While FIG. 2D is illustrated as a series of steps, any of the steps may be omitted, performed in a different order, additional steps may be included, and/or any or all of the steps may be performed in a parallel and/or partially overlapping manner without departing from the disclosure.

In Step 241, the network device determines a color ID for each of the neighbor devices in the set of neighbor devices identified in Step 236 of FIG. 2C. In one or more embodiments disclosed herein, the color ID of each of the neighbor devices among the set of neighbor devices may be retrieved by the network device agent from the network mapping database.

In Step 242, all of the color IDs retrieved in Step 241 are hashed to determine a target color ID. In one or more embodiments, the hashing may be executed by the network device agent using an appropriate hash function and at least the color ID as input. In one embodiment, there is a hash value generated for color ID. The target color ID is the color ID that generated the highest hash value. For example, target ID may be selected using the following function max(hash (S, G, color ID 1), (S, G, color ID 2), (S, G, color ID n+1)), where the color IDs are selected from the set of color IDs obtained in Step 241. As another example, when the route establishment request is a (*, G) join request, the target function may be selected using the following function max(hash(RP address, G, color ID 1), (RP address, G, color ID 2), (RP address, G, color ID n+1)), where the color IDs are selected from the set of color IDs obtained in Step 241.

In one or more embodiments disclosed herein, if the network device is configured with a color ID, the color ID of the neighbor devices that is identical to the color ID of the network device will (in a majority of instances) win the hash (i.e., will most likely be selected as the target color ID). For example, assume that the network device is configured with a color ID of RED. Further assume that the set of neighbor devices has color IDs RED, BLUE, and GREEN. These color IDs (RED, BLUE, and GREEN) are hashed by the network device agent. The RED color ID has the highest probability of winning the hash because it matches the RED color ID of the network device. Alternatively, in the event that an immediate downstream neighbor device that chose the network device as an RPF device has a GREEN color ID and none of the same level network devices have a GREEN color ID, the GREEN color ID may win the hash over the RED color ID. This is to continue a connection of network devices configured with a GREEN color ID starting with the immediate downstream neighbor device that has the GREEN color ID.

In Step 244, a determination is made to determine whether multiple neighbor devices among the set of neighbor devices include the target color ID determined in Step 242. In one or more embodiments, a situation where multiple neighbor devices include the target color ID results in a tie breaker situation. In other words, the network device will have multiple neighbor devices to select from as the RPF device. However, in one or more embodiments, only one of the neighbor devices with a color ID matching the target color ID will be selected as the RPF device. This advantageously ensures that only a single tree is built from the receiver device up towards the source device. Said another way, this advantageously prevents unnecessary trees from being built within the network topology from the receiver device to the source device.

If it is determined that multiple neighbor devices include the target color ID (i.e., multiple neighbor devices have a color ID matching the target color ID determined in Step 242; YES in Step 244), the network device selects in Step 246 the RPF device using the device IDs of the neighbor devices of the subset of neighbor devices that won the hash in Step 242. In one or more embodiments, similar with the color ID, a hash function is iteratively applied to all of the device IDs of the neighbor devices in the set of neighbor devices to generate a set of hash values. The device ID that resulted in the generation of the largest hash value is selected as the RPF device.

In one or more embodiments disclosed herein, in the event that all of the neighbor devices in the set of neighbor devices have unique device IDs (i.e., no two device IDs are the same), the single device ID winning the hash will determine the neighbor device that will be selected as the RPF device. However, in the event that two or more neighbor devices in the set of neighbor devices have the same device ID, the network device will instead use the interface IDs to determine the RPF device, e.g., applying a hash function to each of the interface IDs and selecting the interface ID that generated that highest hash value. In particular, because it is unlikely that two neighbor devices will be configured to have the same interface IDs, there will only be one interface ID selected from among the interface IDs of the neighbor devices.

Returning to Step 244, if it is determined that only a single neighbor device in the set of neighbor devices includes the target color ID (i.e., that only as single neighbor device has a color ID matching the target color ID), the network device selects in Step 248, the single neighbor device with the target color ID as the RPF device. Once the RPF device is selected, the network device transmits the route establishment request discussed in Step 240 of FIG. 2C to the selected RPF device to initiate programming of a route between the selected RPF device and the network device.

To further clarify embodiments of the disclosure, a non-limiting working example is provided in FIGS. 3A-3D.

Start of Example

Figure 3A:
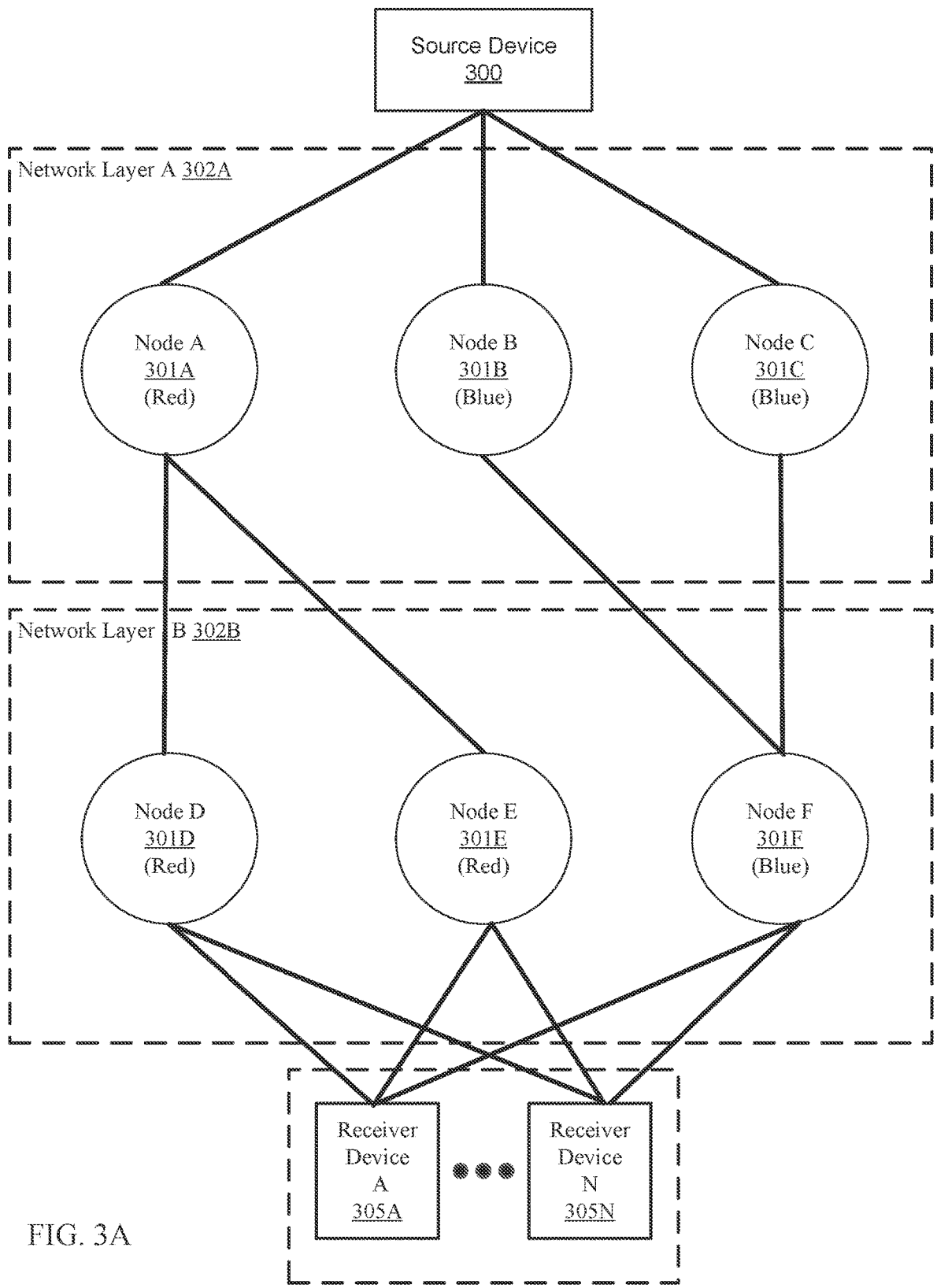
FIGS. 3A-3D show an example in accordance with one or more embodiments described herein.

Initially, assume that a network has a topology shown in FIG. 3A. As shown in FIG. 3A, the source device (300) is physically and directly connected to nodes A through node C (301A-301C) of network layer A (302A) (i.e., a first spine of the network). Each of node A through node C (301A-301C) is configured with a color ID and in turn is physically and directly connected to one or more nodes (Node 301D-301F) of a network layer B (302B) (i.e., a second spine or a first leaf of the network). Node D through node F (301D-301F) are directly connected to receiver devices (305A-305N). All of the nodes (301A-301F) are configured with a unique device ID. Each of the nodes is a network device (e.g., 103A-103N, FIG. 1A; 110, FIG. 1B).

Now further assume that the RPF selection process of one or more embodiments has not been applied to this network. In FIG. 3A, source device (300) wants to send a data packet to the receiver devices (305A-305N) using node A (301A). Because node A is connected to two nodes (i.e., node D (301D) and node E (301E)), node A will make two copies of the data packet received from the source device (300) and transmit one data packet to each of node D (301D) and node E (301E). Similarly, being connected to multiple receiver devices (305A-305N), node D and node E will also make copies of the data packet received from node A (301A) for each connected receiver device (305A-305N).

Using the RPF selection process of one or more embodiments can eliminate the need to replicate the packets at node A (301A). This will be discussed in FIGS. 3B-3D.

Figure 3B:
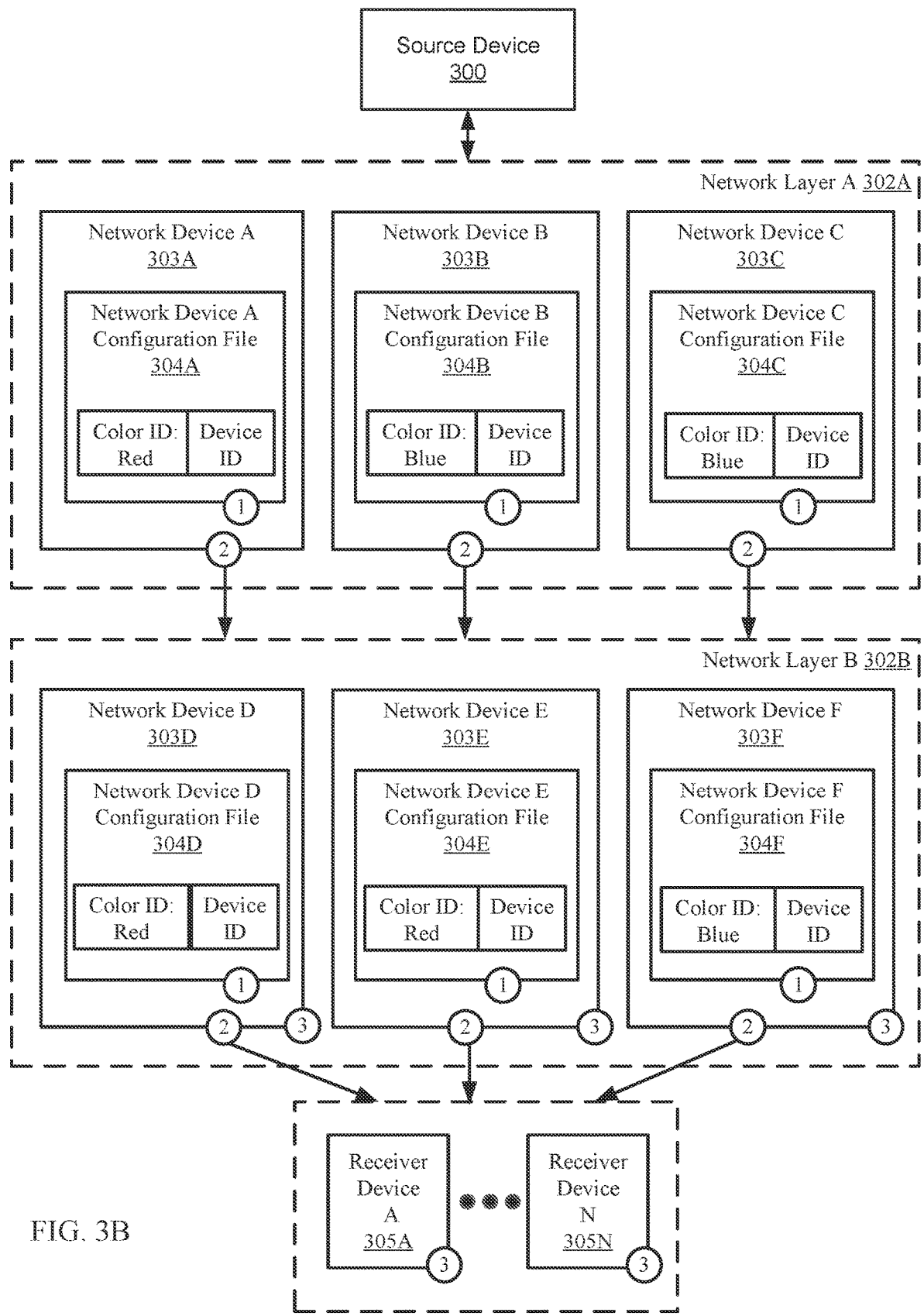

Assume that FIG. 3B shows the same network topology shown in FIG. 3A. The RPF selection process of one or more embodiments will now be applied to build a tree (i.e., a path of connections within the network) starting from the receiver devices (305A-305N) towards the source device (300).

In FIG. 3B, each of the network devices (303A-303F) generates a PIM Hello message including their respective color ID and device ID [1]. The PIM Hello messages are transmitted to the downstream neighbor devices [2]. The network devices (303D-303F) and receiver devices (305A-305N) receiving the PIM Hello messages parse the PIM Hello messages for the color ID and the device ID [3].

Figure 3C:
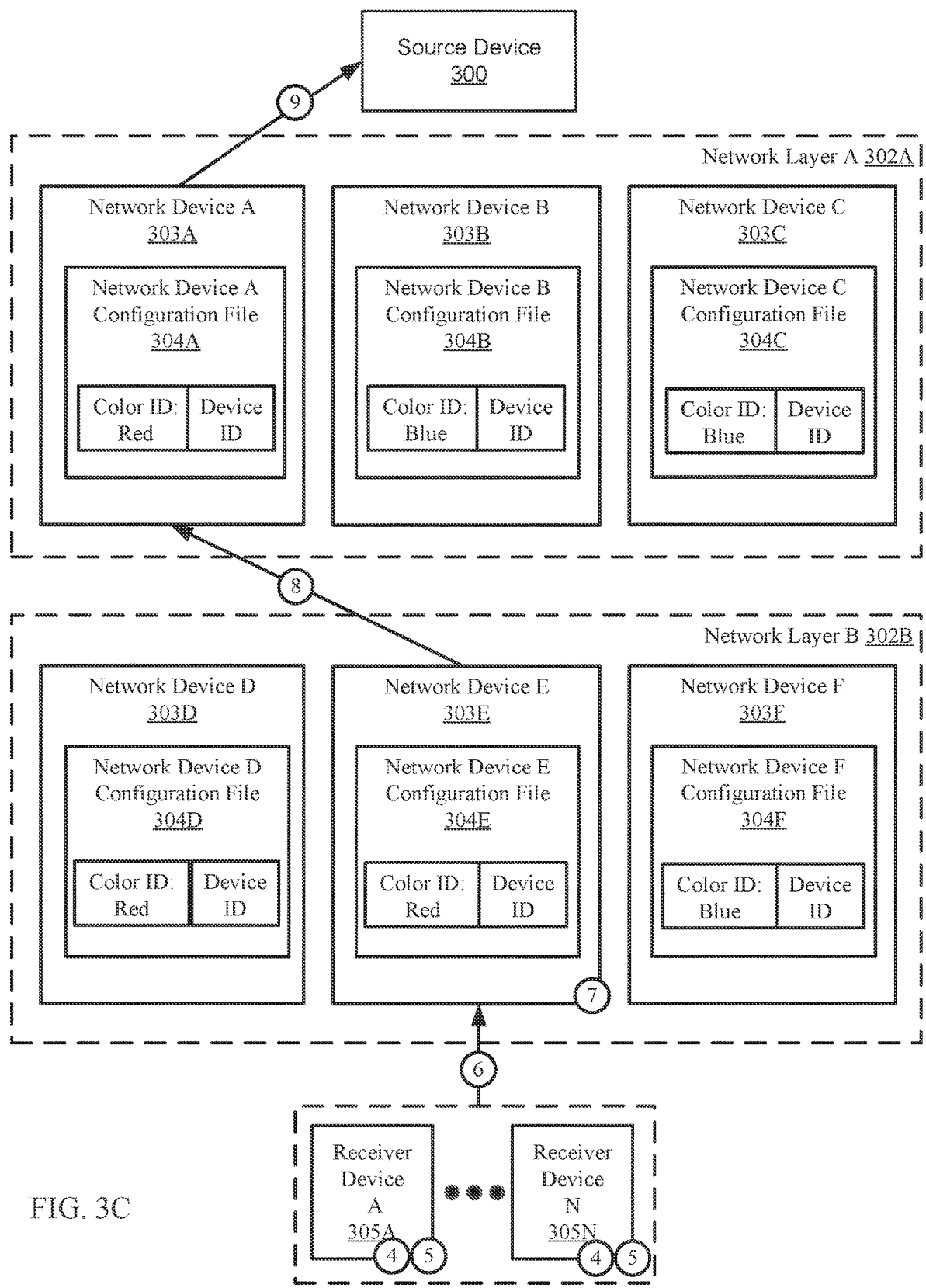

Turning now to FIG. 3C, the receiver devices (305A-305N) hash the color IDs of the network devices (303D-303F) in the network layer B (302B) and the RED color ID wins (i.e., generates the highest hash value) [4]. Because there are two network devices (303D, 303E) having the RED color ID, the receiver devices (305A-305N) hash the unique device IDs of network device D (303D) and network device E (303E) and the unique device ID of network device E (303E) wins (i.e., generates the highest hash value) [5]. Network device E (303E) is selected as the RPF device for the receiver devices (305A-305N) and a path is programmed between network device E (303E) and the receiver devices (305A-305N) [6].

Continuing on, network device E (303E) hashes the color IDs of the network devices (303A-303C) in the network layer A (302A) and the RED color ID wins (i.e., generates the highest hash value) [7]. Network device A (303A) is selected as the RPF device for network device E (303E) and a path is programmed between network device E (303E) and network device A (303A) [8]. Network device A (303A) determines it is connected to the source device (300) [9]. This completes one tree from the receiver devices (305A-305N) to the source device (300).

Figure 3D:
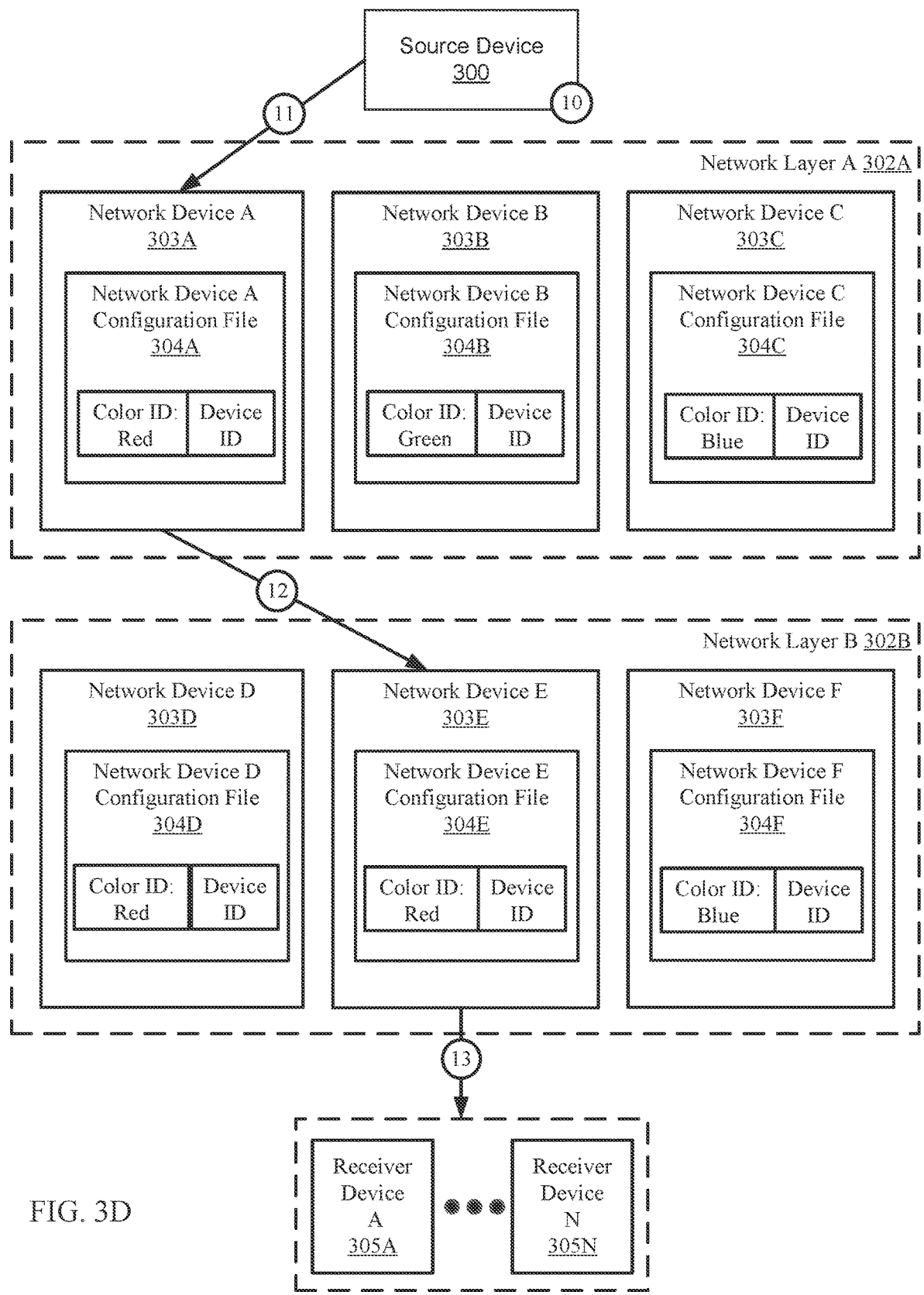

Once the tree is completed in FIG. 3C, assume that in FIG. 3D source device (300) now wants to send a data packet to the receiver devices (305A-305N). Source device (300) prepares a data packet (300) [10]. The data packet is transmitted to network device A (303A) [11]. Without replicating the data packet, network device A (303A) transmits the data packet to network device E (303E) [12]. Network device E (303E) receives the data packet, makes copies of the data packet for each of the receiver devices (305A-305N), and transmits a data packet to each of the receiver devices (305A-305N) [13]. As seen in this configuration of FIG. 3B-3D compared to FIG. 3A, the data packet from the source device (300) is only replicated once within the network topology.

End of Example

Figure 4:
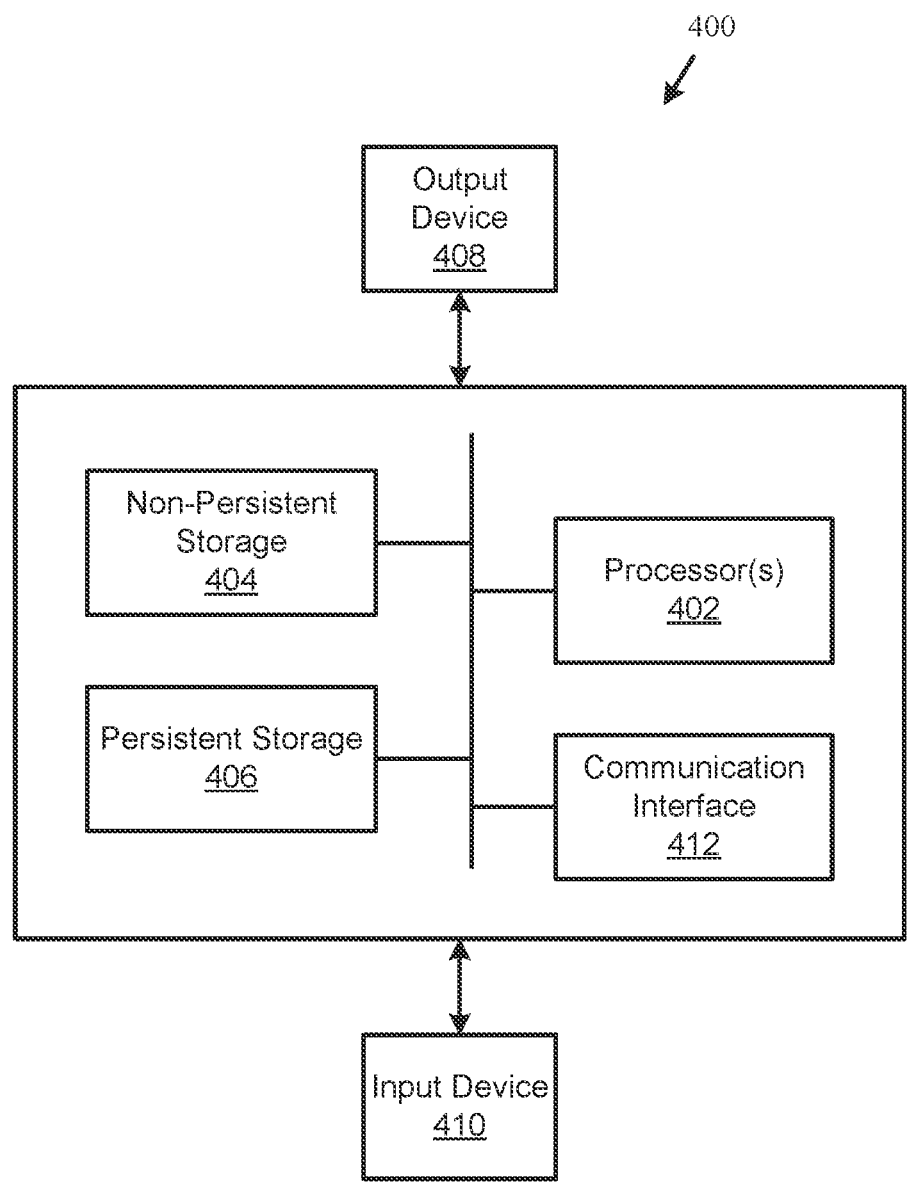
FIG. 4 shows a diagram of a computing device in accordance with one or more embodiments described herein.

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments described herein reduce the amount of redundant data packets being transmitted within the layers of the network fabric between a source device and a receiver device. In particular, by selecting only one RPF device using the RPF selection process of one or more embodiments and providing each network device in the network fabric the same or a topologically equivalent view of their upstream neighbors, the building of unnecessary trees within the network fabric is prevented. Additionally, a data packet being sent from the source device would not need to be replicated until the last possible hop with the network fabric before the receiver device. This advantageously improves the computer functionalities of each network device disposed within the network fabric by preventing computing resources from being wasted on the generation, reception, and/or transmission of the redundant data packets.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for reverse path forwarding (RPF) selection by a network device connected to a network, the method comprising:
   receiving an advertisement message from each of a plurality of neighbor devices within the network;
   parsing the advertisement message to determine a color identification (ID) of each of the neighbor devices, wherein the color ID is associated with a topology of the neighbor devices; and
   selecting, from among the neighbor devices, a RPF device based on the color ID of each of the neighbor devices by:
      applying a hash function to each of the color IDs to generate a set of hash values, wherein a target color ID corresponds to a color ID that generated the highest hash value among the set of hash values;
      determining that the color ID of the first neighbor device and the color ID of a second neighbor device among the neighbor devices match the target color ID;
      selecting, based on the determining, the RPF device from among the first neighbor device and the second neighbor device by applying a second hash function to using a first device ID of the first neighbor device and a second device ID of the second neighbor device;
      applying a second hash function to each of the first device ID and the second device ID to generate a second set of hash values, wherein the first device ID generated a highest hash value in the second set of hash values, wherein the first device ID is different from the second device ID;
      determining that the first device ID matches the first neighbor device; and
      transmitting a path establishment request to the first neighbor device.

2. The method of claim 1, wherein
the path establishment request is a (S, G) join request, and
wherein input to the hash function comprises S, G, and one of the color IDs.

3. The method of claim 1, wherein
the path establishment request is a (*, G) join request, and
wherein input to the hash function comprises rendezvous point (RP) address, G, and one of the color IDs, and
wherein input to the second function comprises the RP address, the G, and one of the first device ID or the second device ID.

4. The method of claim 1, wherein the method further comprises:
   determining that the first device ID matches the second device ID; and
   selecting, based on determining that the first device ID matches the second device ID, the RPF device from among the first neighbor device and the second neighbor device using interface IDs associated with interfaces between the network device and each of the first neighbor device and the second neighbor device,
   wherein the interface IDs are preconfigured and stored in a memory of the network device.

5. The method of claim 4, wherein selecting the RPF device using the interface IDs comprises:
   applying the second hash function to each of the interface IDs to generate a second set of hash values;
   selecting, as a target interface ID and based on applying the second hash function, an interface ID of the interface IDs that generated the highest hash value among the second set of hash values;
   determining that the second neighbor device includes the target interface ID; and
   transmitting the path establishment request to the first neighbor device.

6. The method of claim 1, wherein parsing the advertisement messages to determine the color ID of each of the neighbor devices comprises:
   parsing each of the advertisement messages for an authentication value;
   determining whether the authentication value of each of the advertisement messages matches a preset value; and
   parsing, by the determining, only the advertisement messages with the authentication value that matches the preset value.

7. A network device connected to a network comprising:
a memory; and
a processor coupled to the memory,
wherein the processor is configured to:
receive an advertisement message from each of a plurality of neighbor devices within the network;
parse the advertisement message to determine a color identification (ID) of each of the neighbor devices and store the color IDs of all of the neighbor devices in the storage, wherein the color ID is associated with a topology of the neighbor devices; and
select a neighbor device from among the neighbor devices as a RPF device based on the color ID of each of the neighbor devices by:
applying a hash function to each of the color IDs to generate a set of hash values, wherein a target color ID corresponds to a color ID that generated the highest hash value among the set of hash values;
determining that the color ID of the first neighbor device and the color ID of a second neighbor device among the neighbor devices match the target color ID;
selecting, based on the determining, the RPF device from among the first neighbor device and the second neighbor device by applying a second hash function to using a first device ID of the first neighbor device and a second device ID of the second neighbor device;
applying a second hash function to each of the first device ID and the second device ID to generate a second set of hash values, wherein the first device ID generated a highest hash value in the second set of hash values, wherein the first device ID is different from the second device ID;
determining that the first device ID matches the first neighbor device; and
transmitting a path establishment request to the first neighbor device.

8. The network device of claim 7, wherein the path establishment request is a (S, G) join request, and wherein input to the hash function comprises S, G, and one of the color IDs.

9. The network device of claim 8, wherein input to the second function comprises S, G, and one of the first device ID or the second device ID.

10. The network device of claim 7, wherein the processor is further configured to:
determine that the first device ID matches the second device ID; and
select, based on determining that the first device ID matches the second device ID; the RPF device from among the first neighbor device and the second neighbor device using interface IDs associated with interfaces between the network device and each of the first neighbor device and the second neighbor device,
wherein the interface IDs are preconfigured and stored in the memory of the network device, and
wherein all of the interface IDs are unique.

11. The network device of claim 10, wherein selecting the RPF device using the interface IDs comprises:
applying the second hash function to each of the interface IDs to generate a second set of hash values;
selecting, as a target interface ID and based on applying the second hash function, an interface ID of the interface IDs that generated the highest hash value among the second set of hash values;
determining that the second neighbor device includes the target interface ID; and
transmitting the path establishment request to the second neighbor device.

12. The network device of claim 7, wherein parsing the advertisement messages to determine the color identification ID of each of the neighbor devices comprises:
parsing each of the advertisement messages for an authentication value;
determining whether the authentication value of each of the advertisement messages matches a preset value; and
parsing, by the determining, only the advertisement messages with the authentication value that matches the preset value.

13. The network device of claim 7, wherein
the path establishment request is a (*, G) join request, and
wherein input to the hash function comprises rendezvous point (RP) address, G, and one of the color IDs, and
wherein input to the second function comprises the RP address, the G, and one of the first device ID or the second device ID.

* * * * *